United States Patent
Xue et al.

(10) Patent No.: US 11,595,896 B2
(45) Date of Patent: Feb. 28, 2023

(54) METHODS, APPARATUSES AND SYSTEMS FOR MICRO-SLEEP OPERATION IN SHARED SPECTRUM

(71) Applicant: QUALCOMM Incorporated, San Diego, CA (US)

(72) Inventors: Yisheng Xue, San Diego, CA (US); Xiaoxia Zhang, San Diego, CA (US); Jing Sun, San Diego, CA (US); Aleksandar Damnjanovic, Del Mar, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 16/821,930

(22) Filed: Mar. 17, 2020

(65) Prior Publication Data

US 2020/0305080 A1    Sep. 24, 2020

Related U.S. Application Data

(60) Provisional application No. 62/820,613, filed on Mar. 19, 2019.

(51) Int. Cl.
*H04W 52/02* (2009.01)
*H04L 5/00* (2006.01)
(Continued)

(52) U.S. Cl.
CPC ....... *H04W 52/0229* (2013.01); *H04L 5/0092* (2013.01); *H04W 16/14* (2013.01); *H04W 72/005* (2013.01); *H04W 74/0808* (2013.01)

(58) Field of Classification Search
CPC ............. H04W 52/0229; H04W 16/14; H04W 72/005; H04W 74/0808; H04L 5/0092
(Continued)

(56) References Cited

U.S. PATENT DOCUMENTS

| | | | |
|---|---|---|---|
| 2010/0067421 A1* | 3/2010 | Gorokhov | H04W 52/0206 370/311 |
| 2015/0208340 A1* | 7/2015 | Webb | H04W 52/02 370/311 |

(Continued)

FOREIGN PATENT DOCUMENTS

| | | | | |
|---|---|---|---|---|
| WO | WO-2016072787 A1 * | 5/2016 | | H04W 52/0216 |
| WO | WO-2017116297 A1 * | 7/2017 | | H04W 4/70 |

(Continued)

OTHER PUBLICATIONS

International Search Report—PCT/US2020/023368—ISAEPO—dated Jul. 3, 2020.
(Continued)

*Primary Examiner* — Intekhaab A Siddiquee
(74) *Attorney, Agent, or Firm* — Liem T. Do

(57) ABSTRACT

Methods, systems, and devices for wireless communication are described. A base station may determine a configuration including a set of signature waveforms for a micro-sleep mode of operation in shared spectrum, and may transmit the configuration to at least one user equipment (UE) served by the base station. Additionally, a UE may receive a configuration including a set of signature waveforms for a micro-sleep mode of operation in shared spectrum. The UE may detect at least one signature waveform of the set of signature waveforms, and in response to detecting the at least one signature waveform, operate in the micro-sleep mode for a period of time.

30 Claims, 12 Drawing Sheets

(51) Int. Cl.
*H04W 16/14* (2009.01)
*H04W 72/00* (2009.01)
*H04W 74/08* (2009.01)

(58) Field of Classification Search
USPC ........................................................ 370/329
See application file for complete search history.

(56) References Cited

U.S. PATENT DOCUMENTS

2017/0303192 A1* 10/2017 Sun .................... H04W 52/0216
2017/0303236 A1* 10/2017 Sun ....................... H04W 76/28

FOREIGN PATENT DOCUMENTS

WO   2017180245  A1   10/2017
WO   2017184608  A1   10/2017

OTHER PUBLICATIONS

Qualcomm Incorporated: "Revised SID on NR-based Access to Unlicensed Spectrum", 3GPP Draft, 3GPP TSG RAN Meeting #77, RP-172021 Revision of Study on NR-Based Access to Unlicensed Spectrum—Rev Marks, 3rd Generation Partnership Project (3GPP), Mobile Competence Centre, 650, Route Des Lucioles, F-06921 S, vol. TSG RAN, No. Sapporo, Japan, Sep. 11, 2017-Sep. 14, 2017, Sep. 13, 2017 (Sep. 13, 2017).

* cited by examiner

METHODS, APPARATUSES AND SYSTEMS FOR MICRO-SLEEP OPERATION IN SHARED SPECTRUM

CROSS REFERENCE

The present application for patent claims priority to U.S. Provisional Application No. 62/820,613 by Yisheng Xue et al., entitled "METHODS, APPARATUSES AND SYSTEMS FOR MICRO-SLEEP OPERATION IN SHARED SPECTRUM," filed Mar. 19, 2019, which is assigned to the assignee hereof.

BACKGROUND

The following relates generally to wireless communication, and more specifically to methods, apparatuses, and systems for micro-sleep operation in a shared radio frequency spectrum (or shared spectrum).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In NR, it has been contemplated that the system will support some modes of communications over a shared spectrum or unlicensed radio frequency spectrum of a cellular network. Devices operating in the shared spectrum may employ a listen before talk (LBT) or clear channel assessment (CCA) procedure to ensure the medium is clear before transmitting in the shared spectrum. However, this is not required for devices operating in a licensed spectrum. In this regard, techniques for power saving may be important as devices operating in a shared spectrum deployment typically consume more power as compared to devices operating in a licensed spectrum deployment. Therefore, improved techniques for identifying scenarios when UE micro-sleep is feasible and implementing rules for base station guided UE micro-sleep mode of operation may be desirable.

SUMMARY

The described techniques relate to improved methods, systems, devices, and apparatuses that support micro-sleep operation in shared spectrum. In an aspect, a method for wireless communications includes receiving, at a user equipment (UE), a configuration including a set of signature waveforms for a micro-sleep mode of operation in shared spectrum, detecting, by the UE, at least one signature waveform of the set of signature waveforms, and operating, in response to detecting the at least one signature waveform, in the micro-sleep mode for a period of time.

In another aspect, a method for wireless communications includes determining, by a base station (BS), a configuration including a set of signature waveforms for a micro-sleep mode of operation in shared spectrum, and transmitting, by the BS, the configuration to at least one user equipment (UE) served by the base station.

In some aspects, a UE for wireless communications includes a processor, memory in electronic communication with the processor, and instructions stored in the memory. The instructions are executable by the processor to receive a configuration including a set of signature waveforms for a micro-sleep mode of operation in shared spectrum, to detect at least one signature waveform of the set of signature waveforms, and to operate, responsive to detecting the at least one signature waveform, in the micro-sleep mode for a period of time.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Aspects of the disclosure are initially described in the context of a wireless communications system. Examples of techniques for long term channel sensing are described herein. Aspects of the disclosure are further illustrated by and described with reference to apparatus diagrams, system diagrams, flowcharts, and appendix that support various configurations of bandwidth parts in a shared spectrum.

Figure 1:
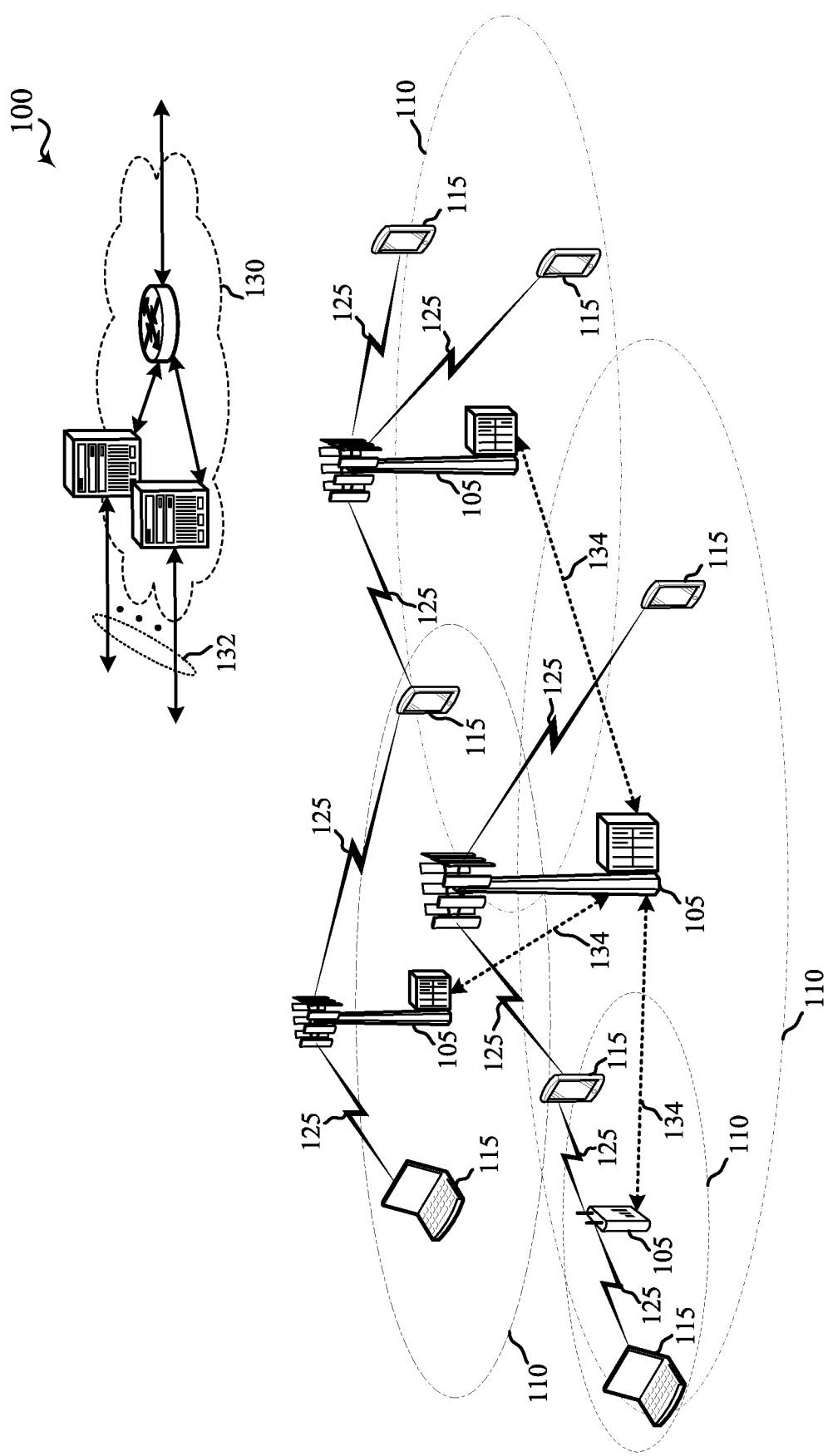
FIG. 1 illustrates an example of a system for wireless communication in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a New Radio (NR) network, a Long Term Evolution (LTE) network, or an LTE-Advanced (LTE-A) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., MTC, narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. eMTC devices may build on MTC protocols and support lower bandwidths in the uplink or downlink, lower data rates, and reduced transmit power, culminating in significantly longer battery life (e.g., extending batter life for several years). References to an MTC may also refer to an eMTC configured device.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band (NR-U) such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Media Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

It is desirable to reduce power consumption for battery powered equipment such as UEs. In general, a UE operating in a shared spectrum deployment consumes more power as compared to a UE operating in a licensed spectrum deployment due to activities related to LBT or CCA. More specifically, a UE operating in the shared spectrum may be required to perform an LBT or CCA procedure before transmitting on the shared medium. For example, a UE may have to perform LBT to compete for channel access in order to transmit on the uplink (e.g., autonomous uplink (AUL), scheduled uplink (SUL), etc.). Additionally, a UE may have to search for any transmission opportunities (TXOPs) acquired by its serving base station of which the time is floating to due LBT. Accordingly, techniques for UE power saving are disclosed in detail below in order to manage and comply with the requirements for devices operating in the shared spectrum.

Figure 2:
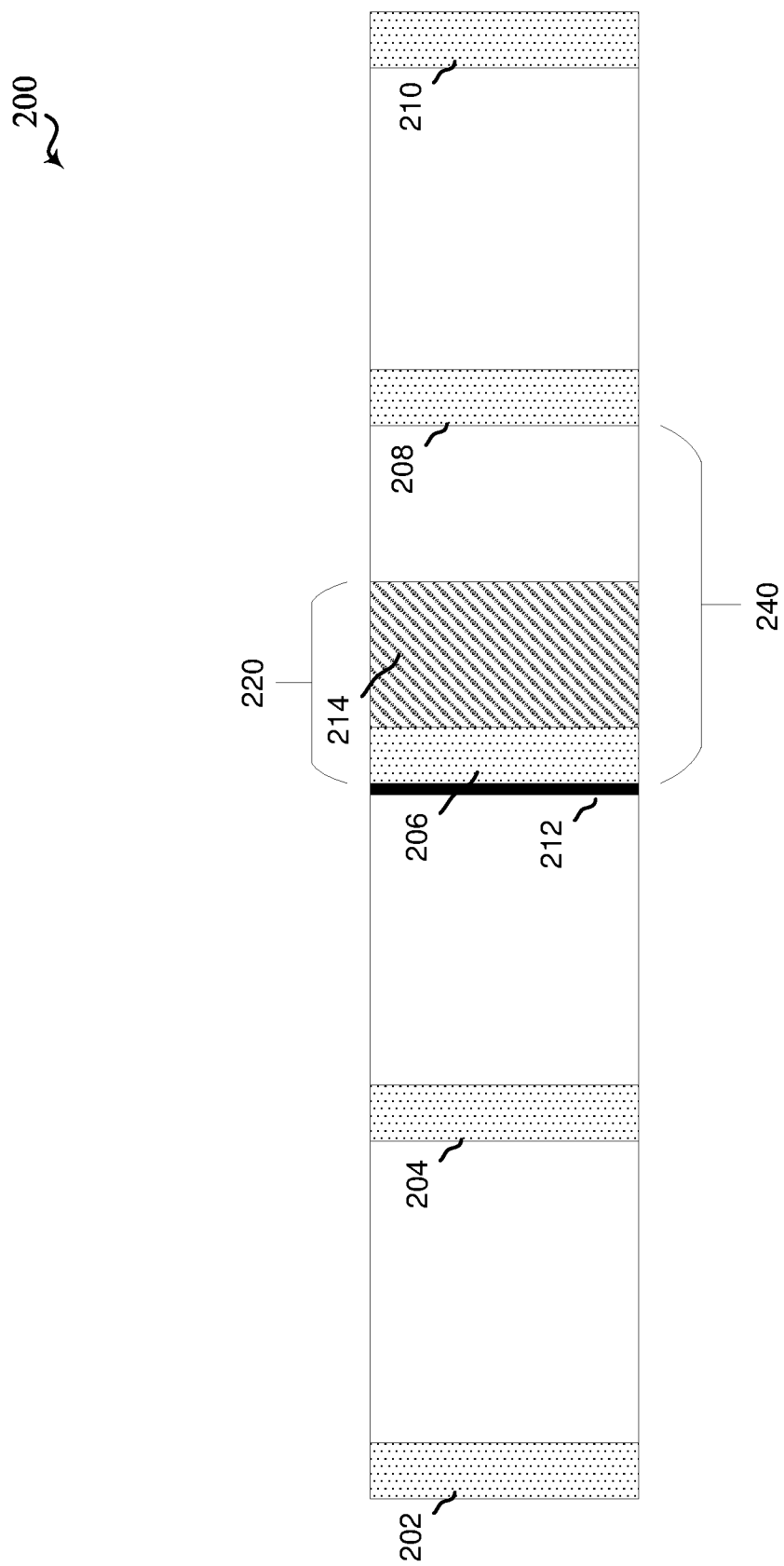
FIG. 2 illustrates a timing diagram of a system for supporting micro-sleep operation in a shared spectrum in accordance with aspects of the present disclosure.

FIG. 2 illustrates a timing diagram 200 of a system or supporting micro-sleep operation in a shared spectrum. In some examples, the system may be deployed as an NR system operating in a shared spectrum, which may include shared frequency bands, such as, for example, unlicensed frequency bands. The system may include base stations (e.g., base station 105 in FIG. 1) and UEs (e.g., UE 115 in FIG. 1) communicating in the shared spectrum. In such an embodiment, the timing diagram 200 may correspond to a communication scheme between a base station 105 and a UE 115 of the network 100 in FIG. 1. The base stations and UEs may share resources with other devices operating the shared spectrum and may employ an LBT procedure to reserve TXOPs in the shared spectrum.

To receive messages from the base station 105, the UE 115 may be configured to monitor a downlink control channel (e.g., physical downlink control channel (PDCCH) monitoring occasion) via an RRC configuration. In FIG. 2, the x-axis represents time in some constant units. In an example, the base station 105 may configure the UE 115 with a plurality of monitoring occasions 202, 204, 206, 208, 210 for monitoring for PDCCH. The duration of each monitoring occasion 202, 204, 206, 208, 210 may be sufficiently long such that the UE can detect a PDCCH from its serving base station who has acquired a TXOP (via LBT) and begun transmission in the shared spectrum. Additionally, the UE 115 may monitor for other types of signals and/or channels (e.g., discovery reference signal (DRS), synchronization signal blocks (SSBs), physical broadcast channel (PBCH), physical downlink shared channel (PDSCH), etc.) during the monitoring occasion 202, 204, 206, 208, 210.

In an aspect, the UE 115 may monitor for a signature waveform that triggers the UE to enter a micro-sleep mode of operation for power saving. Here, the UE 115 may detect a signature waveform 212 during the monitoring occasion 206. For example, the signature waveform 212 may be transmitted by an entity who has acquired a TXOP 214 for a duration of time 220. The signature waveform 212 may be transmitted at the start of the TXOP 214. The entity may include a serving base station, a non-serving base station, another UE, a wide local area network (WLAN) device, or any other device operating in the shared spectrum.

In response to detecting the signature waveform 212, the UE 115 may operate in a micro-sleep mode for power saving. In some examples, the UE 115 may operate in the micro-sleep mode for the duration 220 of the TXOP 214 (also referred to as channel occupancy time (COT)). In some other examples, the UE 115 may operate in the micro-sleep mode for a duration 240 until the next monitoring occasion 208. The duration of the micro-sleep mode may be based on a maximum amount of time that UE is certain that it will not receive any PDCCH from its serving base station. One approach to achieve this is to have the serving base station control which of its served UEs to enable the micro-sleep mode, and determine when it would be safe for those UEs to operate in the micro-sleep mode.

It is noted that the signature waveforms may have a robust design. For example, the signature waveforms may be defined as sequences, such as Zadoff-Chu sequences, with good correlation properties for easy detection. Also, the transmission of the signature waveform may be power boosted to increase the signature waveform signal-to-interference ratio for better detectability. The various types of signature waveforms that may be employed for triggering the UE to safely operate in the micro-sleep mode will be disclosed in detail below.

Figure 3:
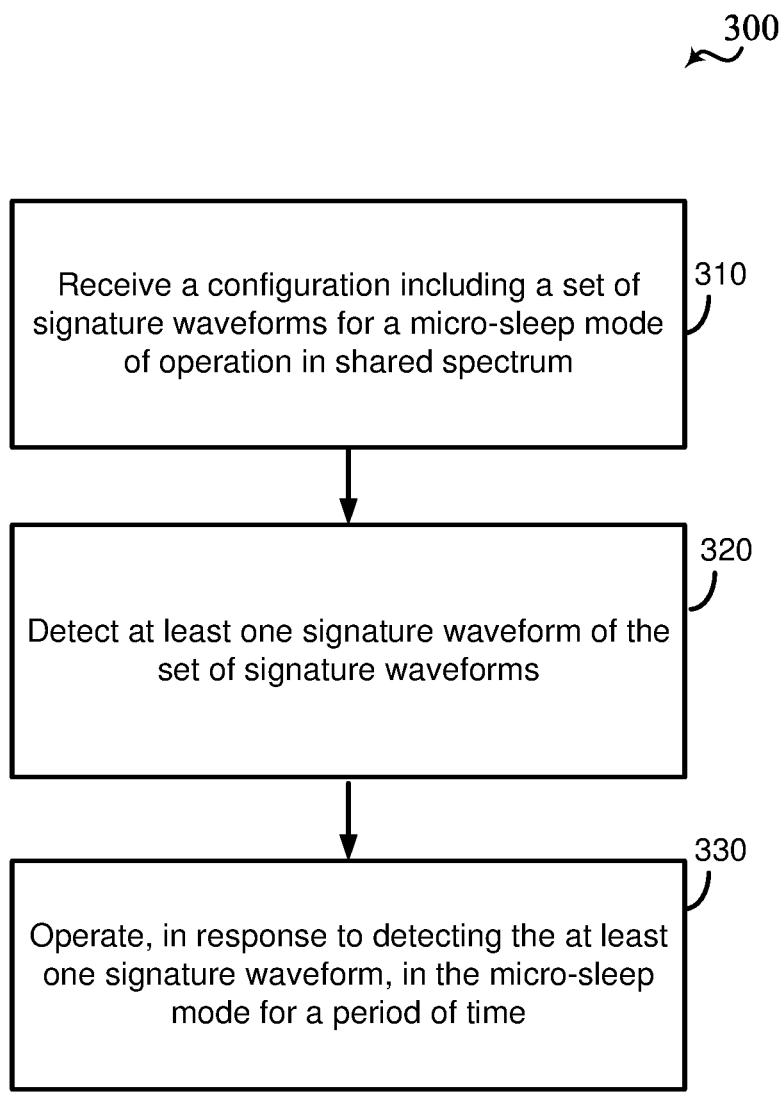
FIGS. 3-4 illustrate block flow diagrams of methods for supporting micro-sleep operation in a shared spectrum in accordance with aspects of the present disclosure.
Figure 4:
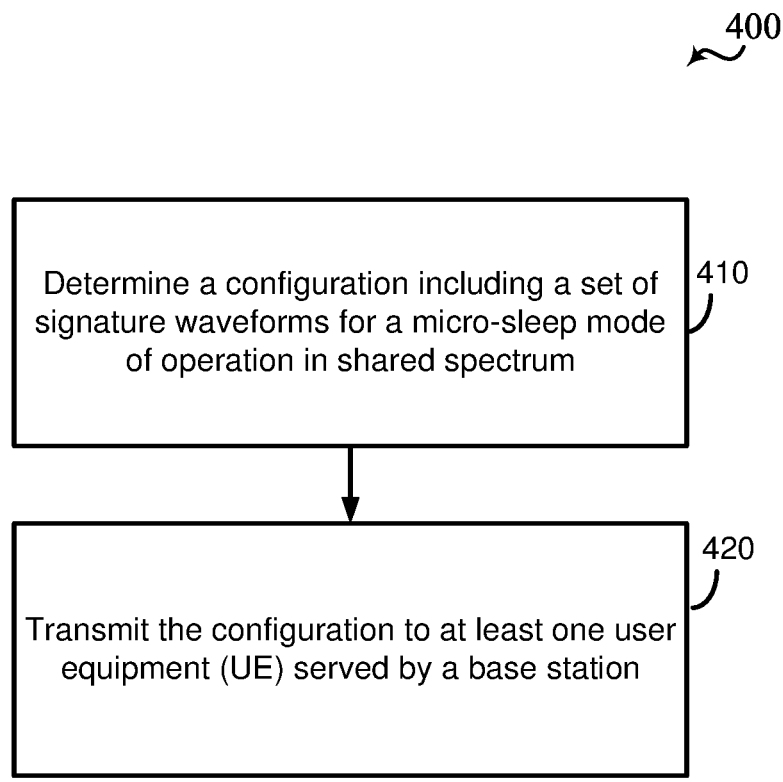

FIGS. 3-4 illustrate block flow diagrams of methods for supporting micro-sleep operation in a shared spectrum in accordance with various aspects of the present disclosure. The methods of FIGS. 3-4 may be described with reference to FIG. 2 and may use the same reference numerals as in FIG. 2 for ease of discussion.

In FIG. 3, a method 300 for supporting micro-sleep operation in a shared spectrum is provided. The operations of the method 300 may be implemented by a UE 115 or its components as described herein with reference to FIGS. 11-12. In some examples, a UE 115 may execute a set of codes to control the functional elements of the device to perform the functions described below. Additionally or alternatively, the UE 115 may perform aspects of the functions described below using special-purpose hardware.

At block 310, a UE 115 may receive a configuration including a set of signature waveforms for a micro-sleep mode of operation in shared spectrum. The operations of block 310 may be performed according to the methods described herein. In some examples, the UE 115 may receive the configuration including the set of signature waveforms via a broadcast channel. For example, the broadcast channel may include a PBCH, and the configuration may be included in system information, such as remaining minimum system information (RMSI).

In other examples, the UE 115 may receive the configuration including the set of signature waveforms via a multicast channel. More specifically, the configuration may be sent in a group common down downlink control channel (e.g., GC-PDCCH). The UE 115 may be included in a group of UEs that have been enabled for micro-sleep operation, and may receive the configuration in common control signaling.

In still other examples, the UE 115 may receive the configuration including the set of signature waveforms via a unicast channel. For example, the UE 115 may receive the configuration via RRC or higher layer signaling. In another aspect, the UE 115 may receive the configuration via a MAC control element sent in a downlink control channel.

At block 320, the UE 115 may detect at least one signature waveform of the set of signature waveforms. The operations of block 320 may be performed according to the methods described herein. In some examples, the UE 115 may detect a signature waveform (e.g., signature waveform 212 in FIG. 2) during a monitoring occasion (e.g., monitoring occasion 206 in FIG. 2).

In some examples, the UE 115 may detect the at least one signature waveform transmitted from a serving base station. In some other examples, the UE 115 may detect the at least one signal waveform transmitted from a non-serving or neighbor base station.

In other examples, the UE 115 may detect the at least one signature waveform transmitted from another UE served by a same base station as the UE. In some other examples, the UE 115 may detect the at least one signature waveform transmitted from other UEs served by a different base station as the UE.

In still other examples, the UE 115 may detect the at least one signature waveform transmitted from a wide local area network (WLAN) device such as, for example, a WiFi device operating in the shared spectrum.

In some other examples, the UE 115 may detect the at least one signature waveform in a particular subband or bandwidth part (BWP). In such an embodiment, the system (e.g., wireless communications system 100 in FIG. 1) may partition the shared frequency band into one or more subbands or BWPs. Each subband or BWP may include a group of contiguous physical resources blocks and may be associated with a particular numerology (e.g., subcarrier spacing, cyclic prefix, etc.), center frequency, and/or bandwidth. Accordingly, the UE may be configured with one or more subbands or BWPs for monitoring the signature waveforms.

In still other examples, the UE 115 may detect the at least one signature waveform in a particular beam direction. More specifically, the system may support communications with multiple antennas or antenna arrays to perform beamforming operations. Beamforming (which may also be referred to as spatial filtering or directional transmission) is a signal processing technique that may be used at a transmitter to shape and/or steer an overall antenna beam in the direction of a target receiver. In this regard, the UE may be configured to monitor for the signature waveforms on one or more beam directions.

At block 330, the UE 115 may operate, in response to detecting the at least one signature waveform, in the micro-sleep mode for a period of time. The operations of block 330 may be performed according to the methods described herein. In some examples, in response to detecting the at least one signature waveform, the UE 115 may safely enter a micro-sleep mode for a duration of time. The UE 115 does not expect to receive any PDCCH from its serving base station during the micro-sleep mode.

In other examples, the detected signature waveform may be associated with a timer. More specifically, one or more signature waveforms may be protected by a timer. In such an embodiment, the UE 115 may operate in the micro-sleep mode when the timer associated with the detected signature waveform has not expired.

In some examples, the UE 115 may operate in the micro-sleep mode for a duration of time that is associated with a COT corresponding to a transmission of the detected signature waveform. As noted above, devices operating in the shared spectrum may contend for the medium (via LBT), and if successful, may reserve a TXOP for a duration of time which may be referred to as a COT. The COT duration may vary (e.g., 2 ms, 4 ms, 6 ms, 8 ms, etc.) and may depend on the channel access priority class. In this regard, the device may transmit the signature waveform at the beginning of the TXOP to reserve the medium for the COT duration. Accordingly, the UE may operate in the micro-sleep mode for the COT duration.

In some other examples, the UE 115 may operate in the micro-sleep mode for a duration that is associated with a monitoring occasion of a downlink control channel. The UE 115 may be configured with a plurality of monitoring occasions (e.g., monitoring occasion 202, 204, 206, 208, 210 in FIG. 2). In such an embodiment, after detecting the signature waveform, the UE may operate in the micro-sleep mode until the next configured monitoring occasion occurs.

In FIG. 4, a method 400 for supporting micro-sleep operation in a shared spectrum is provided. The operations of the method in FIG. 4 may be implemented by a base station 105 or its components as described herein with reference to FIGS. 9-10. In some examples, a base station 105 may execute a set of codes to control the functional elements of the device to perform the functions described below. Additionally or alternatively, the base station 105 may perform aspects of the functions described below using special-purpose hardware.

At block 410, a base station 105 may determine a configuration including a set of signature waveforms for a micro-sleep mode of operation in shared spectrum. The operations of block 410 may be performed according to the methods described herein.

In some examples, the base station 105 may determine the set of signature waveforms associated with one or more base stations. In such an embodiment, the base station 105 may enable the micro-sleep mode during its own TXOP when appropriate. Additionally, the base station 105 may enable the micro-sleep mode during another base station's TXOP. Accordingly, the base station 105 may coordinate with other base stations and determine the signature waveforms associated with the base stations. More specifically, the signature waveforms may be based on a physical cell identity (PCI) or other identification of the base station. In such an embodiment, each signature waveform of the set of signature waveforms may be unique to a respective base station.

In some examples, each signature waveform may include an initial signal associated with a base station-initiated channel occupancy time (COT). In an aspect, a base station may initiate and attempt to acquire a TXOP by performing an LBT procedure in the shared spectrum. Accordingly, if the LBT is successful, the base station may transmit an initial signal, such as a preamble or channel usage reference signal, to reserve the medium for a COT duration. The initial signal may be transmitted on any occupied subband or BWP. The initial signal may help the UE identify the beginning of the base station-initiated COT (or TXOP). Therefore, the signature waveform may include the initial signal transmitted by the base station (e.g., serving or non-serving) which can be used to trigger the micro-sleep mode of operation.

In other examples, the initial signal transmitted by a base station may indicate a duration of the base station-initiated COT. More specifically, the initial signal transmitted by the base station may indicate the duration of the COT. The COT duration may vary (e.g., 2 ms, 4 ms, 6 ms, 8 ms, etc.) and may depend on the channel access priority class. As such, the initial signal may help the UE determine the duration of the COT for operating in the micro-sleep mode.

In some other examples, each signature waveform of the set of signature waveforms may be unique to one or more UEs served by a same base station. In such an embodiment, each base station of a plurality of base stations in a deployment may assign a signature waveform to one or more of its own UEs. Accordingly, the UEs served by the same base station may transmit the signature waveform when performing an uplink transmission in a TXOP. The base stations may coordinate among themselves to exchange such information regarding the assigned signature waveforms of their own UEs.

In some examples, each signature waveform may include an initial signal associated with an uplink-initiated COT. In such an embodiment, another UE may initiate and attempt to acquire a TXOP by performing an LBT procedure in the shared spectrum. In this regard, the other UE may initiate acquiring the TXOP for AUL or SUL transmissions. Accordingly, if the LBT is successful, the other UE may transmit an initial signal, such as a preamble or channel usage reference signal, to reserve the medium for a COT duration. The initial signal may be transmitted on any occupied subband or BWP. The initial signal may help the UE identify the beginning of the uplink-initiated COT associated with the other UE. Thus, the signature waveform may include the initial signal transmitted by another UE which can be used to trigger the micro-sleep mode of operation.

In other examples, the initial signal transmitted by the one or more UEs may indicate a duration of the uplink-initiated COT. More specifically, the initial signal transmitted by the other UE may indicate the duration of the COT. The COT duration may vary (e.g., 2 ms, 4 ms, 6 ms, 8 ms, etc.) and may depend on the channel access priority class. As such, the initial signal may help the UE determine the duration of the COT for operating in the micro-sleep mode.

In still other examples, the base station 105 may determine that other devices associated with a different radio access technology, such as a wireless local area network (WLAN), may be operating in the shared spectrum. In some scenarios, the base station 105 may configure the UE to operate in a micro-sleep mode when the UE detects that a WLAN device has acquired the medium. In such an embodiment, each signature waveform of the set of signature waveforms may include a preamble associated with the WLAN device operating in the shared spectrum. In an aspect, the preamble may include a WiFi preamble comprising a short training field, long training field, and signal field. In other aspects, the preamble may include a basic service set (BSS) coloring as specified in IEEE 802.11ax. It is noted that such signature waveforms associated with a different RAT may be used when the base station 105 is confident that there are no hidden WLAN nodes.

In some other examples, the base station 105 may configure the UE with one or more subbands or BWPs for downlink and/or uplink transmission. In such an embodiment, each signature waveform of the set of signature waveforms may be associated with a subband or bandwidth part (BWP). Accordingly, the UE may be configured to monitor for the signature waveforms on one or more subbands or BWPs. In this regard, the set of signature waveforms may be subband dependent (or BWP dependent).

In still other examples, the base station 105 may configure the UE to monitor for the signature waveforms in one or more beam directions. In such an embodiment, each signature waveform of the set of signature waveforms may be associated with a beam direction. As such, the set of signature waveforms may be beam dependent.

At block 420, the base station 105 may transmit the configuration to at least one UE served by the base station. The operations of block 420 may be performed according to the methods described herein. In some examples, the base station 105 may transmit the configuration via a broadcast channel. More specifically, the broadcast channel may include a PBCH, and the configuration may be included in system information, such as remaining minimum system information (RMSI).

In other examples, the base station 105 may transmit the configuration via a multicast channel. In such an embodiment, the configuration may be sent in a group common down downlink control channel (e.g., GC-PDCCH). The base station 105 may group some of its own UEs for micro-sleep operation, and may send the configuration, to the group of UEs, in common control signaling.

In still other examples, the base station 105 may transmit the configuration via a unicast channel. More specifically, the base station 105 may transmit the configuration via RRC or higher layer signaling. Alternatively, the base station may transmit the configuration via a MAC control element sent in a downlink control channel.

It is noted that the base stations described above may belong to a same operator, and may coordinate and exchange information regarding the signature waveforms via a backhaul interface. However, the techniques disclosed herein may also apply to base stations that belong to different operators as well.

FIGS. 5-8 illustrate block diagrams of signature waveforms that can support micro-sleep operation in a shared spectrum in accordance with aspects of the present disclosure. As previously noted, the base station 105 may configure a UE 115 with a set of signature waveforms for triggering a micro-sleep mode of operation in the shared spectrum.

Figure 5:
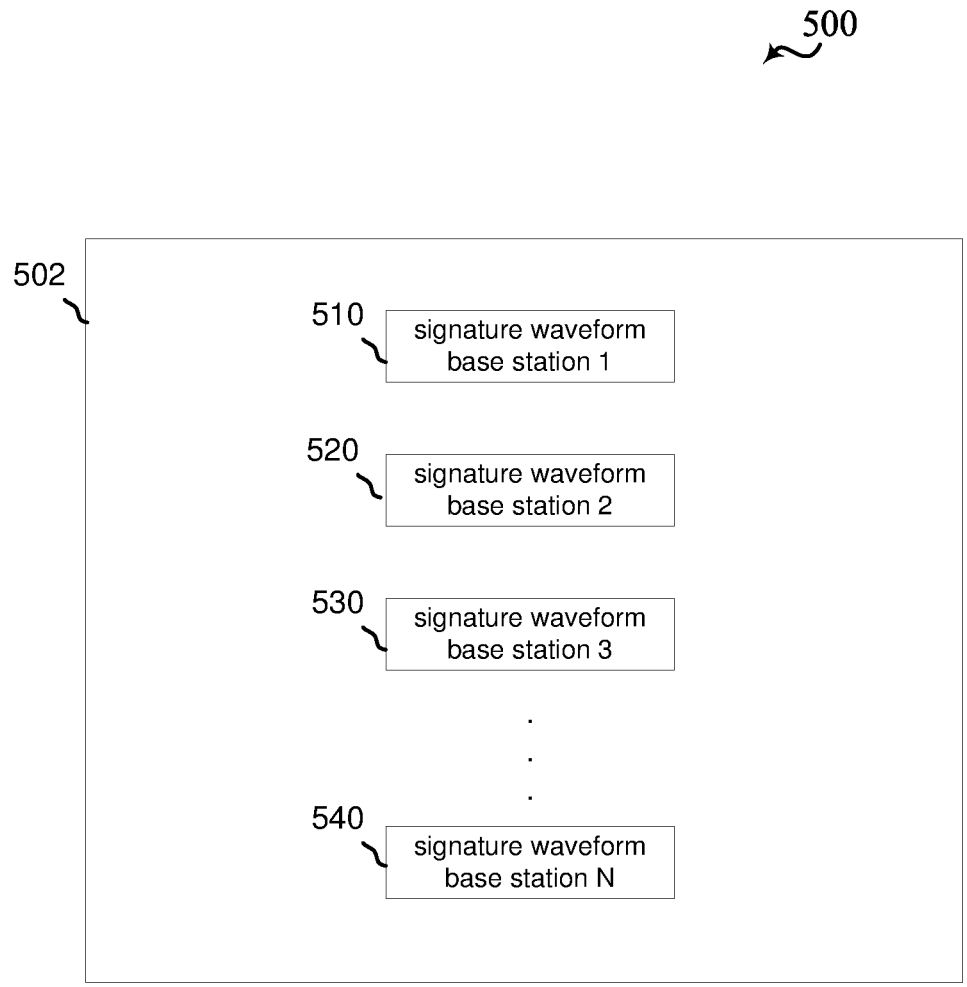
FIGS. 5-8 illustrate block diagrams of signature waveforms for supporting micro-sleep operation in a shared spectrum in accordance with aspects of the present disclosure.

In FIG. 5, the base station 105 may generate a configuration 500 including a set of signature waveforms 502 that may be associated with one or more base stations. In such an embodiment, the set of signature waveforms 502 may comprise a signature waveform 510 associated with base station 1, signature waveform 520 associated with base station 2, signature waveform 530 associated with base station 3, . . . and signature waveform 540 associated with base station N. It is understood that N may be any positive integer. In an aspect, the signature waveform 510 may be associated with a serving base station, and the signature waveforms 520, 530, 540 may be associated with non-serving or neighbor base stations. The signature waveform 510, 520, 530, 540 may be based on a physical cell identity (PCI) or other identification of the base stations. As such, each signature waveform 510, 520, 530, 540 of the set of signature waveforms 502 may be unique to a respective base station.

Additionally, the signature waveform 510, 520, 530, 540 may include an initial signal associated with a base station-initiated COT. As previously described, a base station may initiate and attempt to acquire a TXOP by performing an LBT procedure in the shared spectrum. Accordingly, if the LBT is successful, the base station may transmit an initial signal, such as a preamble or channel usage reference signal, to reserve the medium for a COT duration. The initial signal may help the UE identify the beginning of the base station-initiated COT (or TXOP). Therefore, the signature waveform 510, 520, 530, 540 may include the initial signal transmitted by the base station (e.g., serving or non-serving) which can be used to trigger the micro-sleep mode of operation.

Furthermore, the signature waveform 510, 520, 530, 540 may indicate a duration of the base station-initiated COT. The COT duration may vary (e.g., 2 ms, 4 ms, 6 ms, 8 ms, etc.) and may depend on the channel access priority class. As such, the signature waveform 510, 520, 530, 540 may help the UE determine the duration of the COT for operating in the micro-sleep mode.

Figure 6:
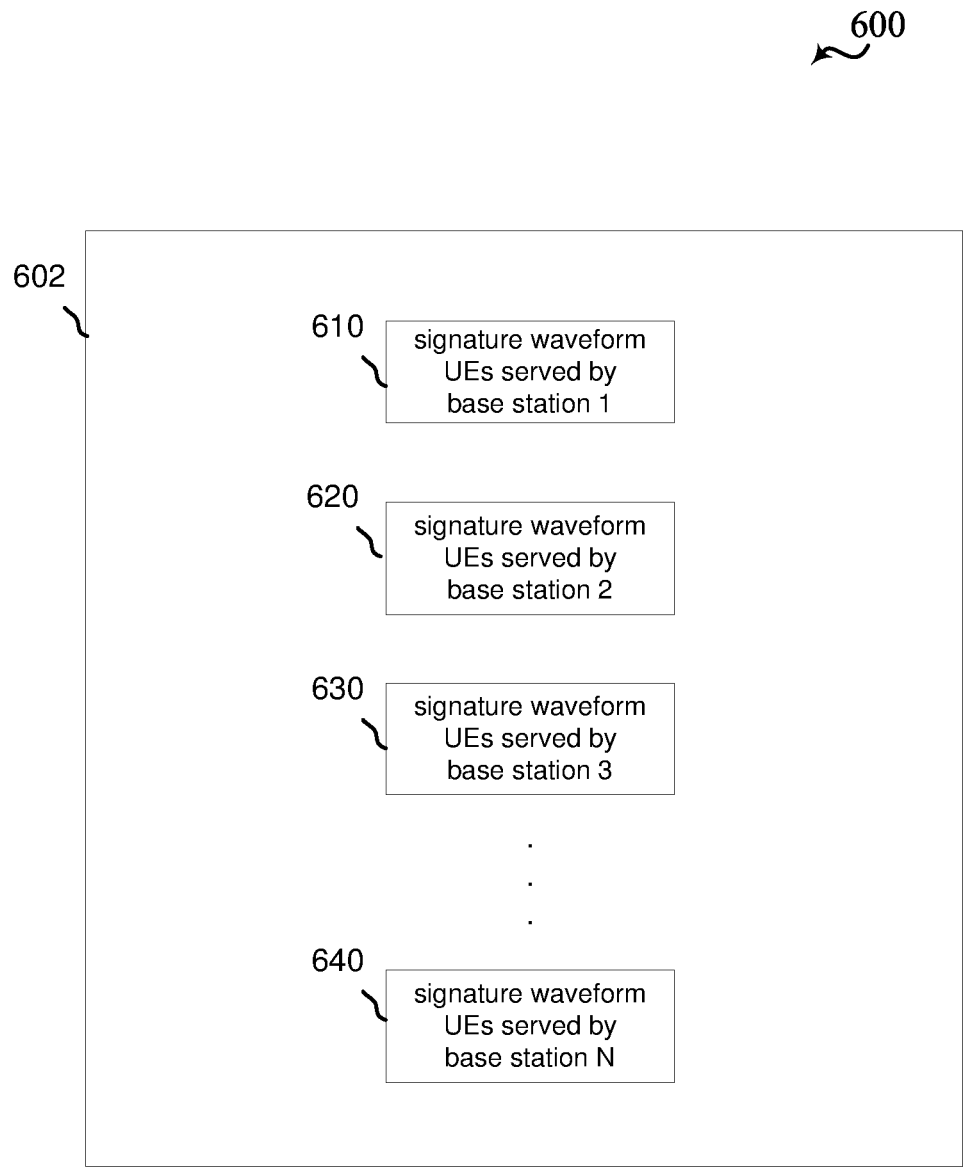

In FIG. 6, the base station 105 may generate configuration 600 including a set of signature waveforms 602 that may be associated with one or more UEs served by a same base station. In such an embodiment, the set of signature waveforms 602 may comprise a signature waveform 610 associated with UEs served by base station 1, signature waveform 620 associated with UEs served by base station 2, signature waveform 630 associated with UEs served by base station 3, . . . signature waveform 640 associated with UEs served by base station N. Accordingly, each signature waveform 610, 620, 630, 640 of the set of signature waveforms 602 may be unique to UEs served by a same base station.

Additionally, the signature waveform 610, 620, 630, 640 may include an initial signal associated with an uplink-initiated COT. As previously described, another UE may initiate and attempt to acquire a TXOP by performing an LBT procedure in the shared spectrum. The TXOP may be acquired for an AUL, SUL, or other type of uplink transmissions. Accordingly, if the LBT is successful, the other UE may transmit an initial signal, such as a preamble or channel usage reference signal, to reserve the medium for a COT duration. The initial signal may help the UE identify the beginning of the uplink-initiated COT of the other UE. Thus, the signature waveform 610, 620, 630, 640 may include the initial signal transmitted by another UE which can be used to trigger the micro-sleep mode of operation.

Furthermore, the signature waveform 610, 620, 630, 640 may indicate a duration of the uplink-initiated COT. More specifically, the COT duration may vary (e.g., 2 ms, 4 ms, 6 ms, 8 ms, etc.) and may depend on the channel access priority class. As such, the signature waveform 610, 620, 630, 640 may help the UE determine the duration of the COT for operating in the micro-sleep mode.

Figure 7:
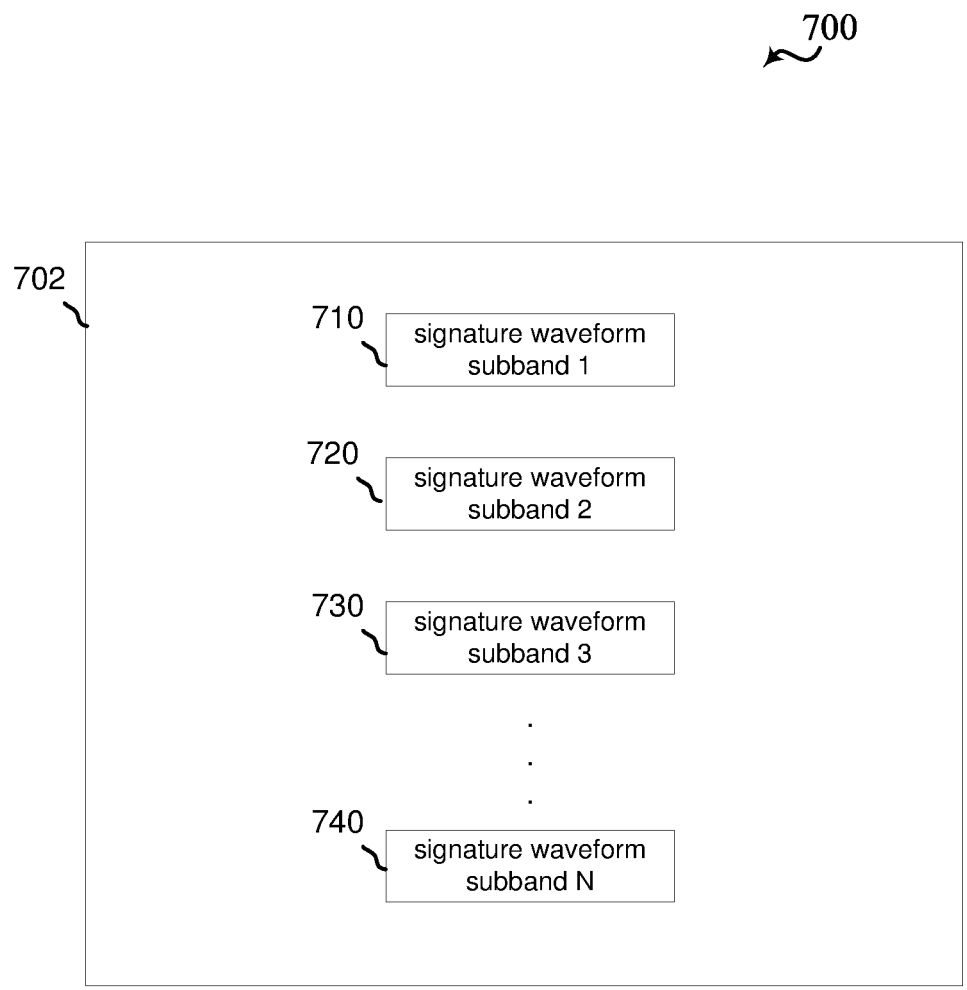

In FIG. 7, the base station 105 may generate a configuration 700 including a set of signature waveforms 702 that are associated with one or more subbands or BWPs. As previously described, the set of signature waveforms 502 may be subband (or BWP) dependent. In such an embodiment, the set of signature waveforms 702 may comprise a signature waveform 710 associated with subband 1 (or BWP 1), signature waveform 720 associated with subband 2 (or BWP 2), signature waveform 730 associated with subband 3 (or BWP 3), . . . and signature waveform 740 associated with subband N (or BWP N). Accordingly, the UE may be configured to monitor a particular subband or BWP for the corresponding signature waveform 710, 720, 730, 740. Alternatively, the signature waveforms 710, 720, 730, 740 may be associated with a plurality of subbands (or BWPs). For example, the signature waveform 710 may be associated with subbands 1 and 2 (or BWP 1 and 2), signature waveform 720 may be associated with subbands 3 and 4 (or BWP 3 and 4), and so forth.

Figure 8:
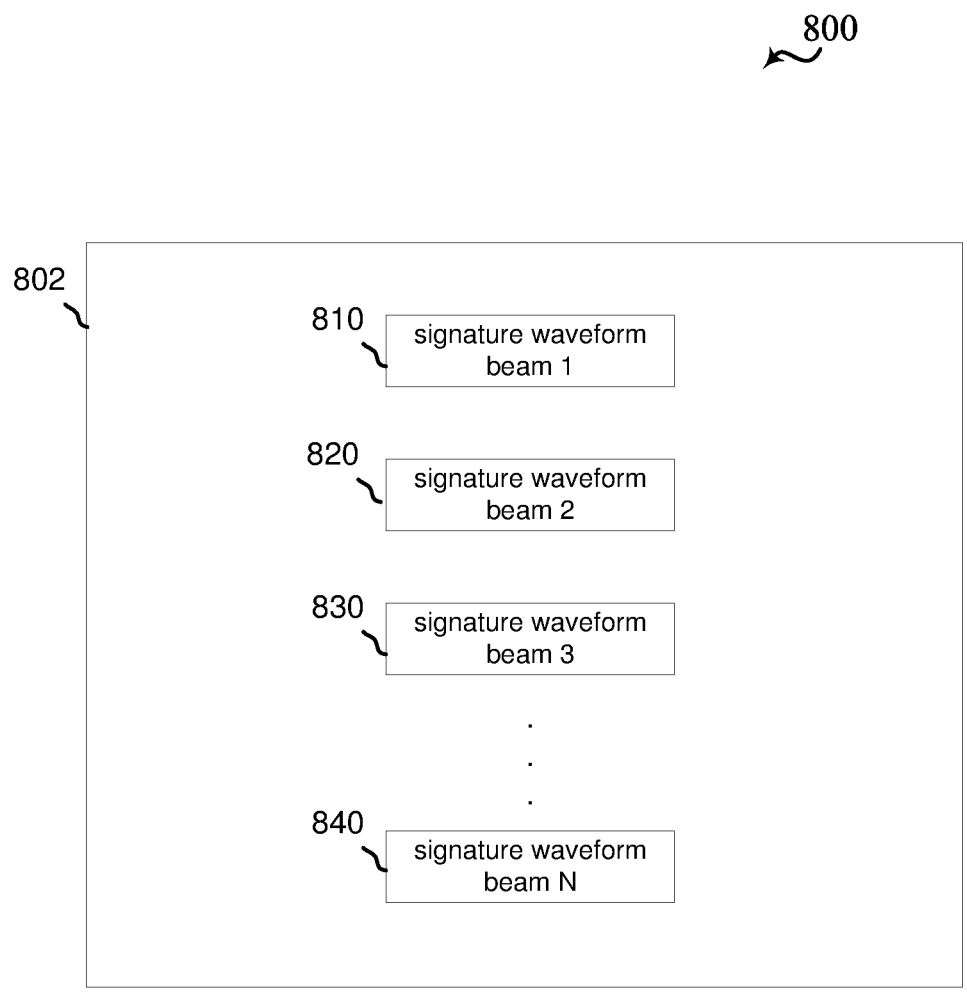

In FIG. 8, the base station 105 may generate a configuration 800 including set of signature waveforms 802 that are associated with one or more beam directions. As previously described, the set of signature waveforms 802 may be beam dependent. In such an embodiment, the set of waveforms 802 may comprise a signature waveform 810 associated with beam 1, signature waveform 820 associated with beam 2, signature waveform 830 associated with beam 3, . . . and signature waveform 840 associated with beam N. Accordingly, the UE may be configured to monitor a particular beam (beam direction) for the corresponding signature waveform 810, 820, 830, 840. Alternatively, the signature waveforms 810, 820, 830, 840 may be associated with a plurality of beams. For example, the signature waveform 810 may be associated with beams 1 and 2, signature waveform 820 may be associated with beams 3 and 4, and so forth.

It is noted that the set of signature waveforms 502, 602, 702, 802 disclosed in FIGS. 5-8, respectively, are mere examples, and that the number of signature waveforms in a set may vary (e.g., N is any positive integer). Furthermore, the configuration of the set of signature waveforms may be generated in various combinations of signature waveforms such as, for example, selecting one or more signature waveforms from the different sets of signature waveforms 502, 602, 702, 802. Accordingly, the UE can safely enter a micro-sleep mode of operation when the UE detects a signature waveform from its serving base station, or from a neighbor base station, or from another UE, or from another RAT device operating in the shared spectrum.

Figure 9:
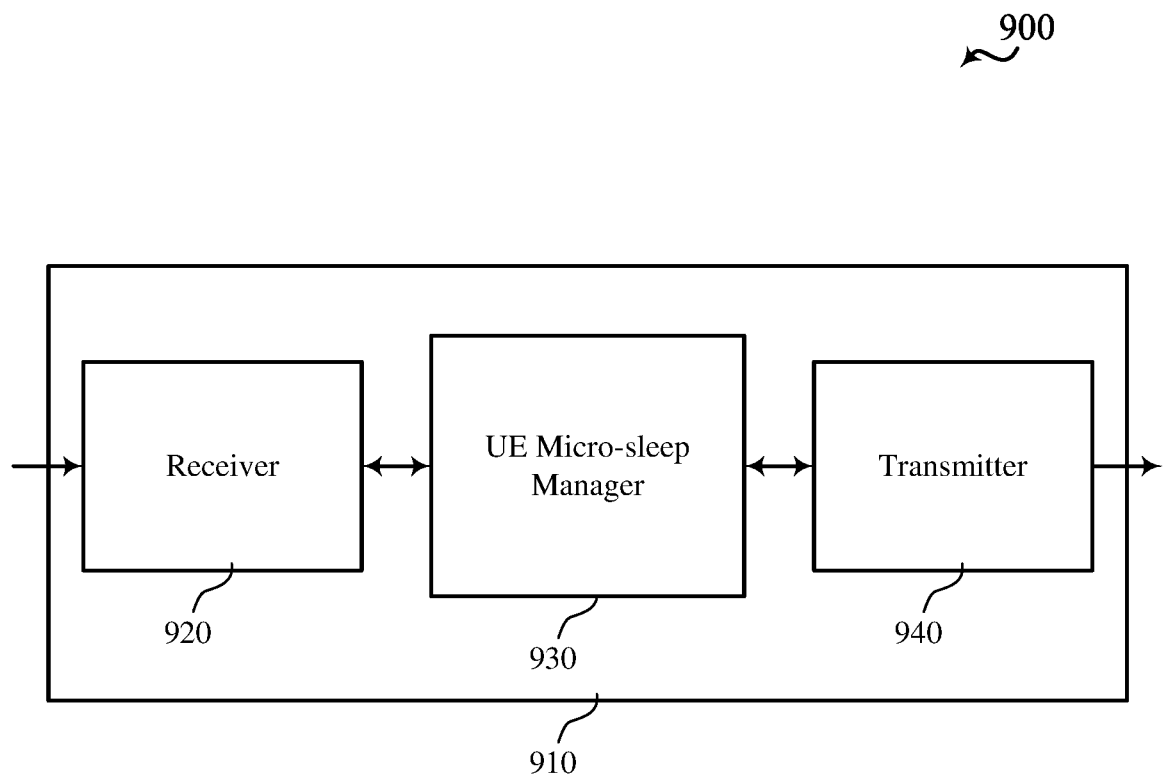
FIG. 9 illustrates a block diagrams of a device that supports micro-sleep operation in a shared spectrum in accordance with aspects of the present disclosure.

FIG. 9 shows a block diagram 900 of a wireless device 910 that supports micro-sleep operation in a shared spectrum in accordance with aspects of the present disclosure. Wireless device 910 may be an example of aspects of a base station 105 as described herein. Wireless device 910 may include a receiver 920, UE micro-sleep manager 930, and transmitter 940. Wireless device 910 may also include a processor. Each of these components may be in communication with one another (e.g., via one or more buses).

Receiver 920 may receive information such as packets, user data, or control information associated with various uplink channels such as PUCCH, PUSCH, PRACH, sounding reference signal (SRS), scheduling request (SR), and the like. Information may be passed on to other components of the device. The receiver 920 may be an example of aspects of the transceiver 1035 described with reference to FIG. 10. The receiver 920 may utilize a single antenna or a set of antennas.

Figure 10:
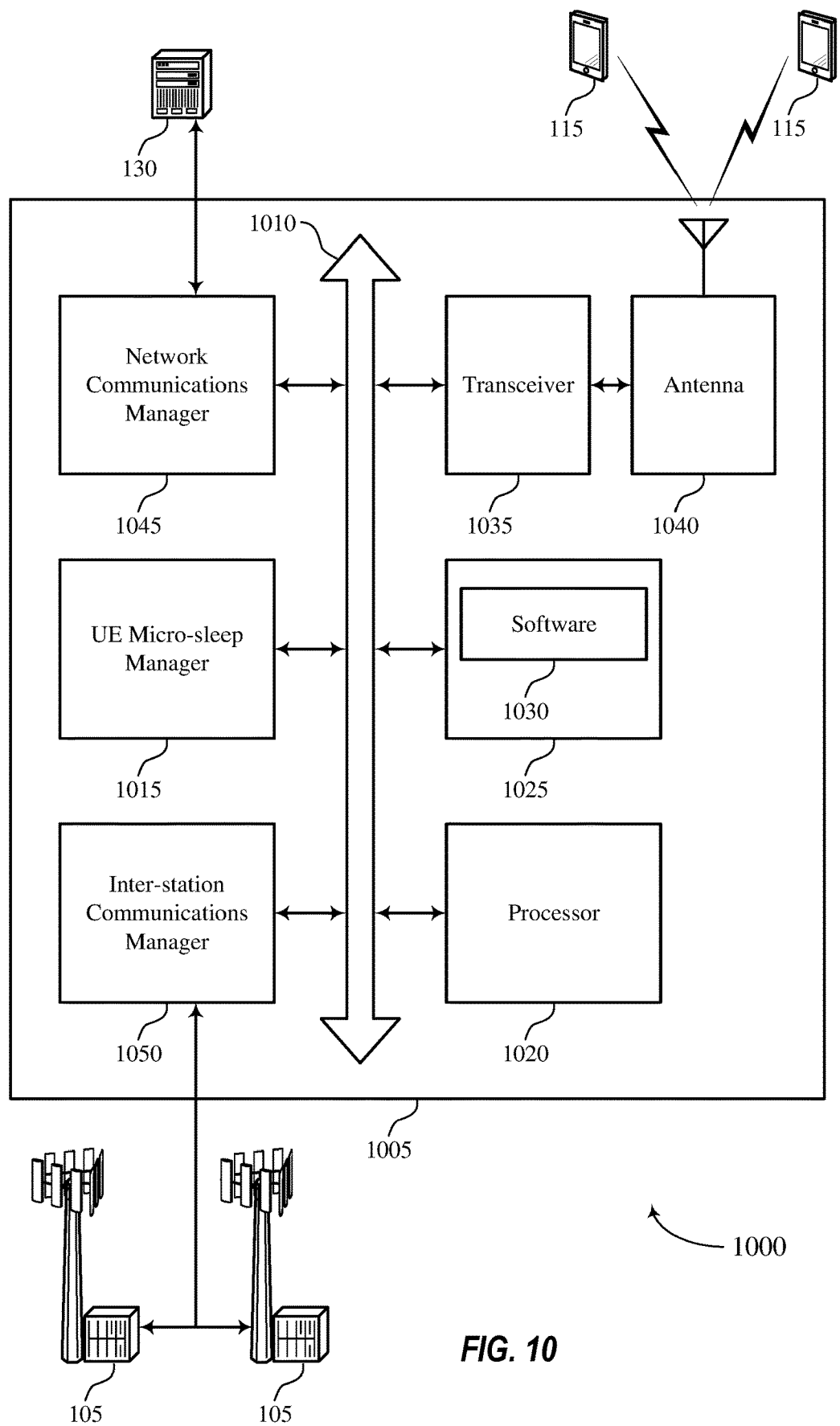
FIG. 10 illustrates a block diagram of a system including a base station that supports micro-sleep operation in a shared spectrum in accordance with aspects of the present disclosure.

The UE micro-sleep manager 930 may be an example of aspects of UE micro-sleep manager 1015 described with reference to FIG. 10.

The UE micro-sleep manager 930 and/or at least some of its various sub-components may be implemented in hardware, software executed by a processor, firmware, or any combination thereof. If implemented in software executed by a processor, the functions of the UE micro-sleep manager 930 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE micro-sleep manager 930 and/or at least some of its various sub-components may be physically located at various positions, including being distributed such that portions of functions are implemented at different physical locations by one or more physical devices. In some examples, the UE micro-sleep manager 930 and/or at least some of its various sub-components may be a separate and distinct component in accordance with various aspects of the present disclosure. In other examples, the UE micro-sleep manager 930 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The UE micro-sleep manager 930 may manage the set of signature waveforms for supporting micro-sleep mode of operation in the shared spectrum as described herein. The set of signature waveforms may be UE-specific or may be common to a group of UEs.

Transmitter 940 may transmit signals generated by other components of the device. In some examples, the transmitter 940 may be collocated with a receiver 920 in a transceiver module. For example, the transmitter 940 may be an example of aspects of the transceiver 1035 described with reference to FIG. 10. The transmitter 940 may utilize a single antenna or a set of antennas.

Transmitter 940 may transmit information such as packets, user data, or control information associated downlink signals/channels such as PSS/SSS, PBCH, PHICH, PDCCH, PDSCH, and the like. In some examples, the transmitter 940 may transmit FIG. 10 shows a diagram of a system 1000 including a device 1005 that supports micro-sleep operation in a shared spectrum in accordance with aspects of the present disclosure. Device 1005 may be an example of or include the components of wireless device 910, or a base station 105 as described herein. Device 1005 may include components for bi-directional voice and data communications including components for transmitting and receiving communications, including UE micro-sleep manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more user equipment (UE)s 115.

The UE micro-sleep manager 1015 may manage and direct a micro-sleep mode of operation for one or more UEs as described in various aspects and examples herein.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting long term channel sensing in a shared spectrum).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support micro-sleep operation in a shared spectrum. The software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an NR wireless communication network technology to provide communication between base stations 105.

Figure 11:
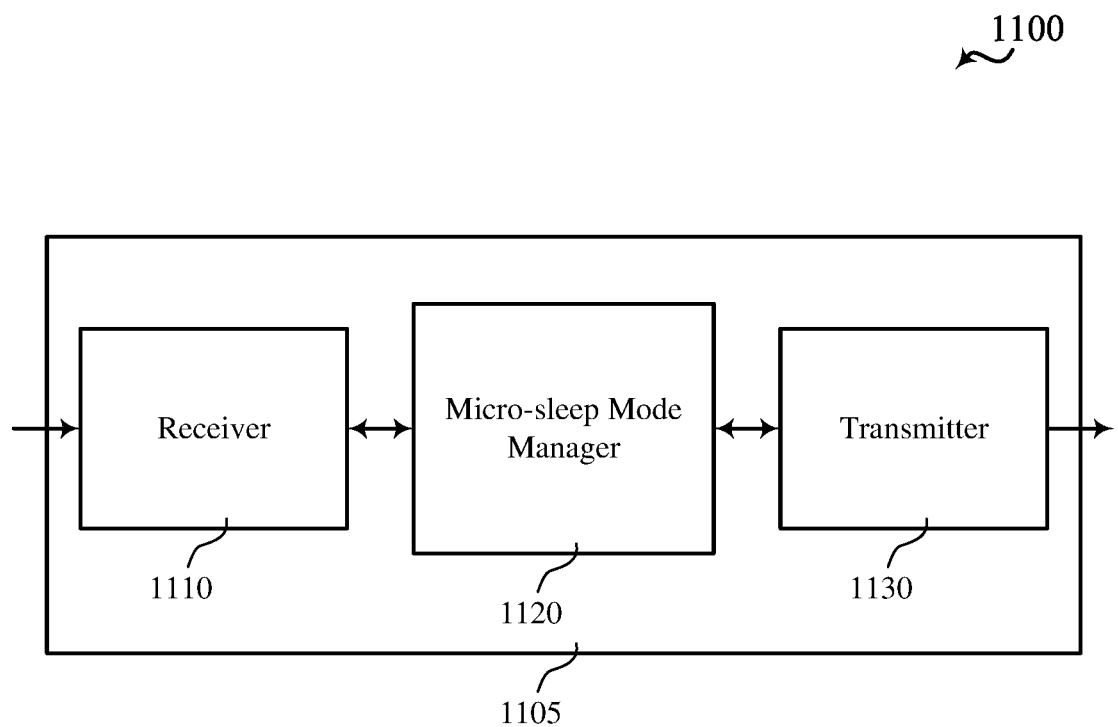
FIG. 11 illustrates a block diagram of a device that supports micro-sleep operation in a shared spectrum in accordance with aspects of the present disclosure.

FIG. 11 shows a block diagram 1100 of a wireless device 1105 that supports micro-sleep operation in a shared spectrum in accordance with aspects of the present disclosure. Wireless device 1105 may be an example of aspects of a UE 115 as described herein. Wireless device 1105 may include receiver 1110, micro-sleep mode manager 1120, and transmitter 1130. Wireless device 1105 may also include a processor. Each of these components may be in communication with one another (e.g., via one or more buses).

Receiver 1110 may receive information such as packets, user data, or control information associated downlink signals/channels such as PSS/SSS, PBCH, PHICH, PDCCH, PDSCH, and the like. Information may be passed on to other components of the device. The receiver 1110 may be an example of aspects of the transceiver 1235 described with reference to FIG. 12. The receiver 1110 may utilize a single antenna or a set of antennas.

The micro-sleep mode manager 1120 may be an example of aspects of the micro-sleep mode manager 1215 described with reference to FIG. 12.

The micro-sleep mode manager 1120 and/or at least some of its various sub-components may be implemented in hardware, software executed by a processor, firmware, or any combination thereof. If implemented in software executed by a processor, the functions of the micro-sleep mode manager 1120 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The micro-sleep mode manager 1120 and/or at least some of its various sub-components may be physically located at various positions, including being distributed such that portions of functions are implemented at different physical locations by one or more physical devices. In some examples, micro-sleep mode manager 1120 and/or at least some of its various sub-components may be a separate and distinct component in accordance with various aspects of the present disclosure. In other examples, the micro-sleep mode manager 1120 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The micro-sleep mode manager 1120 may manage a configuration including a set of signature waveforms for micro-sleep mode of operation in the shared spectrum as described herein. The configuration may be received from a serving base station, and Transmitter 1130 may transmit signals generated by other components of the device. In some examples, the transmitter 1130 may be collocated with a receiver 1110 in a transceiver module. For example, the transmitter 1130 may be an example of aspects of the transceiver 1235 described with reference to FIG. 12. The transmitter 1130 may utilize a single antenna or a set of antennas.

Figure 12:
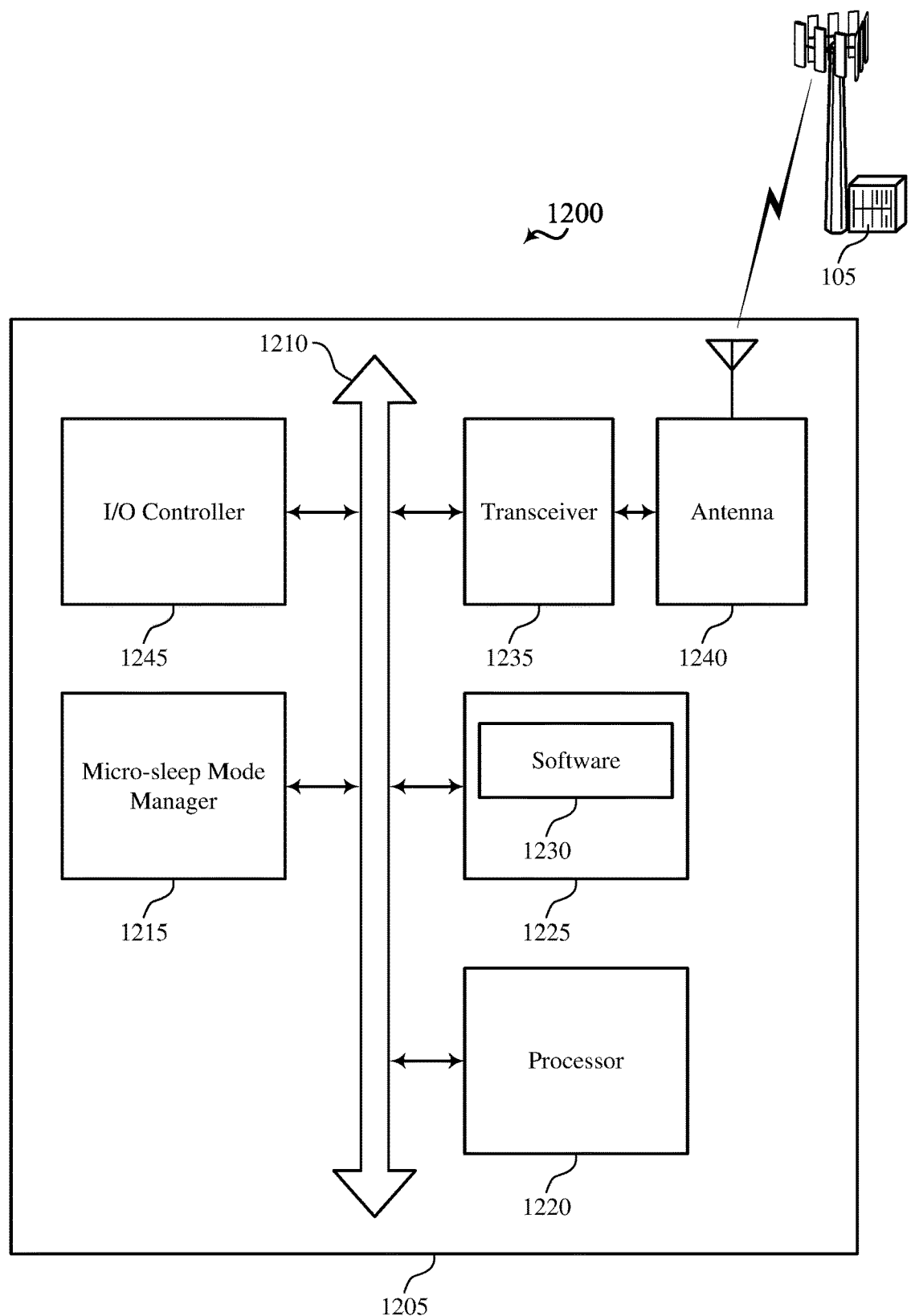
FIG. 12 illustrates a block diagram of a system including a UE that supports micro-sleep operation in a shared spectrum in accordance with aspects of the present disclosure.

FIG. 12 shows a diagram of a system 1200 including a device 1205 that supports micro-sleep operation in a shared spectrum in accordance with aspects of the present disclosure. Device 1205 may be an example of or include the components of UE 115 as described above herein. Device 1205 may include components for bi-directional voice and data communications including components for transmitting and receiving communications, including micro-sleep mode manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

The micro-sleep mode manager 1215 may maintain the configuration parameters and manage various procedures to support micro-sleep mode of operation in the shared spectrum as described herein.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting operation with multiple BW parts in a shared spectrum).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support multiple BW parts a shared spectrum. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

It should be noted that the methods described above describe possible implementations, and that the operations and the steps may be rearranged or otherwise modified and that other implementations are possible. Furthermore, aspects from two or more of the methods may be combined.

In an aspect, a base station (BS) for wireless communications is provided which comprises a processor; memory in electronic communication with the processor; and instructions stored in the memory. The instructions are executable by the processor to: determine a configuration including a set of signature waveforms for a micro-sleep mode of operation in shared spectrum; and transmit the configuration to at least one user equipment (UE) served by the base station. In some aspects, the instructions executable by the processor to transmit comprises instructions executable by the processor to transmit the configuration via at least one of a broadcast channel, a multicast channel, or a unicast channel.

In an aspect, a non-transitory computer-readable medium storing code for wireless communications is provided which includes code comprising instructions executable to: receive, at a user equipment (UE), a configuration including a set of signature waveforms for a micro-sleep mode of operation in shared spectrum; detect, by the UE, at least one signature waveform of the set of signature waveforms; and operate, responsive to the detecting the at least one signature waveform, in the micro-sleep mode for a period of time. In some aspects, the instructions executable to receive comprises instructions executable to receive the configuration from a serving base station via at least one of a broadcast channel, a multicast channel, or a unicast channel.

In some aspects, a non-transitory computer-readable medium storing code for wireless communications is provided which includes code comprising instructions executable to: determine, by a base station, a configuration including a set of signature waveforms for a micro-sleep mode of operation in shared spectrum; and transmit the configuration to at least one user equipment (UE) served by the base station. In some aspects, the instructions executable to transmit comprises instructions executable to transmit the configuration via at least one of a broadcast channel, a multicast channel, or a unicast channel.

In some aspects, an apparatus for wireless communications is provided which comprises means for receiving, at a user equipment (UE), a configuration including a set of signature waveforms for a micro-sleep mode of operation in shared spectrum; means for detecting, by the UE, at least one signature waveform of the set of signature waveforms; and means for operating, in response to detecting the at least one signature waveform, in the micro-sleep mode for a period of time. In some aspects, the means for receiving comprises means for receiving the configuration from a serving base station via at least one of a broadcast channel, a multicast channel, or a unicast channel.

In some aspects, an apparatus for wireless communications is provided which comprises means for determining, by a base station (BS), a configuration including a set of signature waveforms for a micro-sleep mode of operation in shared spectrum; and means for transmitting, by the BS, the configuration to at least one user equipment (UE) served by the base station. In some aspects, the means for transmitting comprises means for transmitting the configuration via at least one of a broadcast channel, a multicast channel, or a unicast channel.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. It should be noted that the base stations may be deployed by the same operator or different operators. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and system of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
receiving, at a user equipment (UE), a configuration including a set of signature waveforms for a micro-sleep mode of operation in shared spectrum;
detecting, by the UE, at least one signature waveform of the set of signature waveforms, wherein the at least one signature waveform is associated with a channel access priority class; and
operating, in response to detecting the at least one signature waveform, in the micro-sleep mode for a period of time, wherein the period of time is based on the channel access priority class, wherein the channel access priority is associated with a channel occupancy time duration.

2. The method of claim 1, wherein the receiving comprises receiving the configuration from a serving base station via at least one of a broadcast channel, a multicast channel, or a unicast channel.

3. The method of claim 1, wherein the at least one signature waveform is associated with a timer; and
wherein the operating comprises operating in the micro-sleep mode when the timer has not expired.

4. The method of claim 1, wherein each signature waveform of the set of signature waveforms is unique to a respective base station.

5. The method of claim 4, wherein each signature waveform includes an initial signal associated with a base station-initiated channel occupancy time (COT) of the respective base station.

6. The method of claim 5, wherein the initial signal indicates a duration of the base station-initiated COT.

7. The method of claim 1, wherein each signature waveform of the set of signature waveforms is unique to one or more UEs served by a same base station.

8. The method of claim 7, wherein each signature waveform includes an initial signal associated with an uplink-initiated channel occupancy time (COT) of the one or more UEs.

9. The method of claim 8, wherein the initial signal indicates a duration of the uplink-initiated COT.

10. The method of claim 1, wherein each signature waveform of the set of signature waveforms includes a preamble associated with a wireless local area network operating in the shared spectrum.

11. The method of claim 1, wherein each signature waveform of the set of signature waveforms is associated with at least one of a subband, a bandwidth part, or a beam direction.

12. The method of claim 1, wherein the period of time includes a duration associated with a channel occupancy time corresponding to a transmission of the at least one signature waveform.

13. The method of claim 12, wherein the period of time further includes another duration associated with a monitoring occasion of a downlink control channel.

14. A method of wireless communications, comprising:
determining, by a base station (BS), a configuration including a set of signature waveforms for a micro-sleep mode of operation in shared spectrum, wherein at least one signature waveform of the set of signature waveforms is associated with a channel access priority class, wherein the micro-sleep mode of operation has a period of time that is based on the channel access priority class, wherein the channel access priority is associated with a channel occupancy time duration; and
transmitting, by the BS, the configuration to at least one user equipment (UE) served by the base station.

15. The method of claim 14, wherein the transmitting comprises transmitting the configuration via at least one of a broadcast channel, a multicast channel, or a unicast channel.

16. The method of claim 14, wherein each signature waveform of the set of signature waveforms is unique to a respective base station.

17. The method of claim 16, wherein each signature waveform includes an initial signal associated with a base station-initiated channel occupancy time (COT) of the respective base station.

18. The method of claim 14, wherein each signature waveform of the set of signature waveforms is unique to one or more UEs served by a same base station.

19. The method of claim 18, wherein each signature waveform includes an initial signal associated with an uplink-initiated channel occupancy time (COT) of the one or more UEs.

20. The method of claim 14, wherein each signature waveform of the set of signature waveforms includes a preamble associated with a wireless local area network operating in the shared spectrum.

21. The method of claim 14, wherein each signature waveform in the set of signature waveforms is associated with at least one of a subband, a bandwidth part, or a beam direction.

22. A user equipment (UE) for wireless communications, comprising:
a processor;
memory in electronic communication with the processor;
instructions stored in the memory, wherein the instructions are executable by the processor to:
receive a configuration including a set of signature waveforms for a micro-sleep mode of operation in shared spectrum;
detect at least one signature waveform of the set of signature waveforms, wherein the at least one signature waveform is associated with a channel access priority class; and
operate, responsive to detecting the at least one signature waveform, in the micro-sleep mode for a period of time, wherein the period of time is based on the channel access priority class, wherein the channel access priority is associated with a channel occupancy time duration.

23. The UE of claim 22, wherein the instructions executable by the processor to receive comprises instructions executable by the processor to receive the configuration from a serving base station via at least one of a broadcast channel, a multicast channel, or a unicast channel.

24. The UE of claim 22, wherein the at least one signature waveform is associated with a timer; and
wherein the instructions executable by the processor to operate comprises instructions executable by the processor to operate in the micro-sleep mode when the timer has not expired.

25. The UE of claim 22, wherein each signature waveform of the set of signature waveforms is unique to a respective base station.

26. The UE of claim 22, wherein each signature waveform of the set of signature waveforms is unique to one or more UEs served by a same base station.

27. The UE of claim 26, wherein each signature waveform includes an initial signal associated with an uplink-initiated channel occupancy time (COT) of the one or more UEs.

28. The UE of claim 22, wherein each signature waveform of the set of signature waveforms includes a preamble associated with a wireless local area network operating in the shared spectrum.

29. The UE of claim 22, wherein each signature waveform of the set of signature waveforms is associated with at least one of a subband, a bandwidth part, or a beam direction.

30. The UE of claim 22, wherein the period of time includes a duration associated with a channel occupancy time corresponding to a transmission of the at least one signature waveform.

* * * * *